United States Patent
Li et al.

(10) Patent No.: US 9,987,888 B2
(45) Date of Patent: Jun. 5, 2018

(54) TIRE PRESSURE MONITORING SENSOR SUITABLE FOR USE IN AN ENVIRONMENT WITH LIQUIDS AND/OR IMPURITIES

(71) Applicant: SHANGHAI BAOLONG AUTOMOTIVE CORPORATION, Shanghai (CN)

(72) Inventors: Wei Li, Shanghai (CN); Weihua Shi, Shanghai (CN); Hongjun Duan, Shanghai (CN); Qian Long, Shanghai (CN)

(73) Assignee: Shanghai Baolong Automotive Corporation, Shanghai (CN)

( * ) Notice: Subject to any disclaimer, the term of this patent is extended or adjusted under 35 U.S.C. 154(b) by 178 days.

(21) Appl. No.: 14/909,662

(22) PCT Filed: Jul. 10, 2014

(86) PCT No.: PCT/CN2014/081940
§ 371 (c)(1),
(2) Date: Feb. 2, 2016

(87) PCT Pub. No.: WO2015/014199
PCT Pub. Date: Feb. 5, 2015

(65) Prior Publication Data
US 2017/0158001 A1 Jun. 8, 2017

(30) Foreign Application Priority Data
Aug. 2, 2013 (CN) .................... 2013 2 0472777 U

(51) Int. Cl.
*B60C 23/02* (2006.01)
*B60C 23/04* (2006.01)
(Continued)

(52) U.S. Cl.
CPC ...... *B60C 23/0493* (2013.01); *B60C 23/0408* (2013.01); *B60C 23/0494* (2013.01);
(Continued)

(58) Field of Classification Search
None
See application file for complete search history.

(56) References Cited

U.S. PATENT DOCUMENTS 5,228,337 A * 7/1993 Sharpe ............... B60C 23/0408
340/445
2004/0078662 A1 * 4/2004 Hamel ............... B60C 23/0411
714/22
(Continued)

*Primary Examiner* — Andre Allen
(74) *Attorney, Agent, or Firm* — Fish & Richardson P.C.

(57) ABSTRACT

A tire pressure monitoring sensor includes a housing, a pressure sensor core, a PCB with a processing circuit, a battery, a transmitting antenna and a metallic cover plate. The pressure sensor core includes a tube socket, a silicon piezoresistive element, a sensor shell, a seal, a ceramic body, a pressure sensing and transferring medium, an output terminal, a metallic sensing diaphragm and a protective shield. The metallic sensing diaphragm is subjected to a pressure, which is delivered to through said pressure sensing and transferring medium, and finally a pressure signal is output by said output terminal. The tire pressure monitoring sensor meets the requirements for application in an engineering vehicle or a special vehicle, and is suitable for use in an environment in the presence of liquid.

6 Claims, 2 Drawing Sheets

(51) Int. Cl.
*G01L 17/00* (2006.01)
*G01L 19/06* (2006.01)
*G01L 9/00* (2006.01)

(52) U.S. Cl.
CPC .......... *B60C 23/0498* (2013.01); *G01L 9/008* (2013.01); *G01L 9/0042* (2013.01); *G01L 9/0054* (2013.01); *G01L 17/00* (2013.01); *G01L 19/0654* (2013.01)

(56) References Cited

U.S. PATENT DOCUMENTS

| 2007/0193349 | A1* | 8/2007 | Petrucelli | B60C 23/0408 73/146.8 |
| 2008/0079333 | A1* | 4/2008 | Ulm | B60C 23/0411 310/339 |

* cited by examiner

TIRE PRESSURE MONITORING SENSOR SUITABLE FOR USE IN AN ENVIRONMENT WITH LIQUIDS AND/OR IMPURITIES

FIELD OF THE INVENTION

The present application relates to a tire pressure monitoring sensor (referred to as TPMS), which is suitable for engineering vehicle tires or for special vehicles in the presence of liquid.

BACKGROUND

Generally, the current tire pressure monitoring sensors directly sense air pressure by using a pressure measuring aperture (air aperture), so as to measure the pressure. The air aperture is required not to be blocked. Once it is blocked, the change in pressure cannot be sensed correctly, and the deviation of the measurement is relatively large.

However, in the engineering vehicles or some special vehicles, due to their special environments, liquid is usually added into the tire, and there are much dust and other impurities in the working environment. Thus, for a tire pressure sensor using the air aperture, the air aperture can be easily blocked by the liquid in the tire. As such, it is difficult to accurately measure the tire pressure.

FIG. 1 is a sectional view of a chip package 50 of a prior art tire pressure monitoring sensor. The main problems with the prior art include the following issues.

1. The pressure input aperture is very small and can be easily blocked, and once blocked, the pressure cannot be sensed. Thus, it is impossible to detect the pressure and output a signal.

2. Since the front side of the sensor chip 52 is in direct contact with the measured environment and the bonding wire (gold wire) 54 and other materials 56 are also in direct contact with the measured environment, the reliability and the compatibility of the product are greatly influenced.

3. In the engineering vehicles or some special vehicles, due to their special environments, liquid is usually added into the tire, and there is much dust and other impurities in the work environment, which increases the risk of blocking the air aperture and damaging the chip 52 and bonding wire 54.

In view of the above problems, German patent No. DE 102010000003 discloses a pressure sensor available for measurement in an environment in the presence of liquid, which uses a permeable protective film for sealing. In practical use, it is necessary to consider the permeability of the protective film. If the pressure sensor is applied to the measurement of tire pressure, after long-term operation, dust and impurities are easily deposited on the surface of the protective film, thereby making the sensor ineffective and resulting in inaccurate measurement and other abnormal situations.

Chinese patent No. CN 00226918.X discloses a pressure sensor suitable for use in a liquid environment, which senses the pressure by using a thin metallic diaphragm. However, since the metallic diaphragm is very thin, it is easily deformed under the action of an external force, resulting in inaccurate pressure measurement. Thus, the pressure sensor is unsuitable for operation in a tire environment in the presence of liquid and impurities.

SUMMARY

The technical problem to be solved by the present application is to provide a tire pressure monitoring sensor which meets the requirement for applications in a tire of an engineering vehicle or a special vehicle and can be in normal use in the working environment in the presence of liquid and impurities, such as dust.

In order to solve the above technical problem, the present application provides a tire pressure monitoring sensor, comprising a TPMS housing, a pressure sensor core, a PCB (printed circuit board) with a processing circuit, a battery, a transmitting antenna, and a metallic cover plate.

Said pressure sensor core comprises a tube socket, a silicon piezoresistive element, a sensor shell, a seal, a ceramic body, a pressure sensing and transferring medium, an output terminal, a metallic sensing diaphragm and a protective shield.

Said metallic sensing diaphragm is subjected to a pressure, which is delivered to said silicon piezoresistive element through said pressure sensing and transferring medium, and finally a pressure signal is output by said output terminal.

Said seal is an O-ring, which is mounted on said sensor shell, and is used for sealing between said sensor shell and said protective shield.

Said ceramic body and said tube socket are mounted on said sensor shell to serve connecting and supporting functions.

Said protective shield passes through a large aperture provided on said TPMS housing, and a plurality of openings is provided by hollowing out the protective shield, so as to ensure that the measurement of pressure is unaffected while protecting the metallic sensing diaphragm.

Optionally, said TPMS housing, said PCB with a processing circuit, and said battery are sealed by pouring a sealant.

Optionally, a seal can also be used for the sealing between said pressure sensor core and said TPMS housing.

Optionally, said tire pressure monitoring sensor is mounted on a tire or a rim via said metallic cover plate.

Optionally, a chamfered structure is used at the junction between said protective shield and said metallic sensing diaphragm.

Optionally, said protective shield is a separate part, or is integrated with said TPMS housing.

Compared with the prior art, the present application owns the following features and advantages:

1. The silicon piezoresistive element in the pressure sensor core is not in direct contact with the measured environment; meanwhile, the metallic sensing diaphragm and the pressure sensing and transferring medium are used for the transmission of pressure without affecting the measurement precision. Moreover, the risks of blocking the air aperture and damaging the chip and binding wire due to the liquid added into the tire and the large amount of dust and other impurities in the working environment are eliminated.

2. The protective shield is used to protect the pressure sensor core, so that the pressure input aperture can be larger, and at the same time, a chamfered design is used at the junction between the pressure input aperture and the metallic sensing diaphragm, so that the transition is smooth, and tiny impurities that may be left can be flushed utilizing the fluidity of liquid, which solves the problem that the pressure input aperture is easily blocked. Thus, the product can be used to measure the pressure and output a signal. Meanwhile, it is possible to avoid the damage on the metallic sensing diaphragm caused by some harder impurities.

BRIEF DESCRIPTION OF THE DRAWINGS

The above-mentioned and other features, aspects and advantages of the present application will become more apparent from the following description of embodiments with reference to the accompany drawings, in which.

DETAILED DESCRIPTION

The present application will be further described herein in conjunction with detailed description and the accompanying drawings. More details are provided in the following description in order for the present application to be fully understood. However, the present application is meant to be implemented in various ways other than those described herein. A person skilled in the art can make similar analogy and alteration according to practical applications without departing from the connotation of the present application, and therefore the contents of the detailed description herein should not be interpreted to limit the scope of the protection of the present application.

Figure 1:
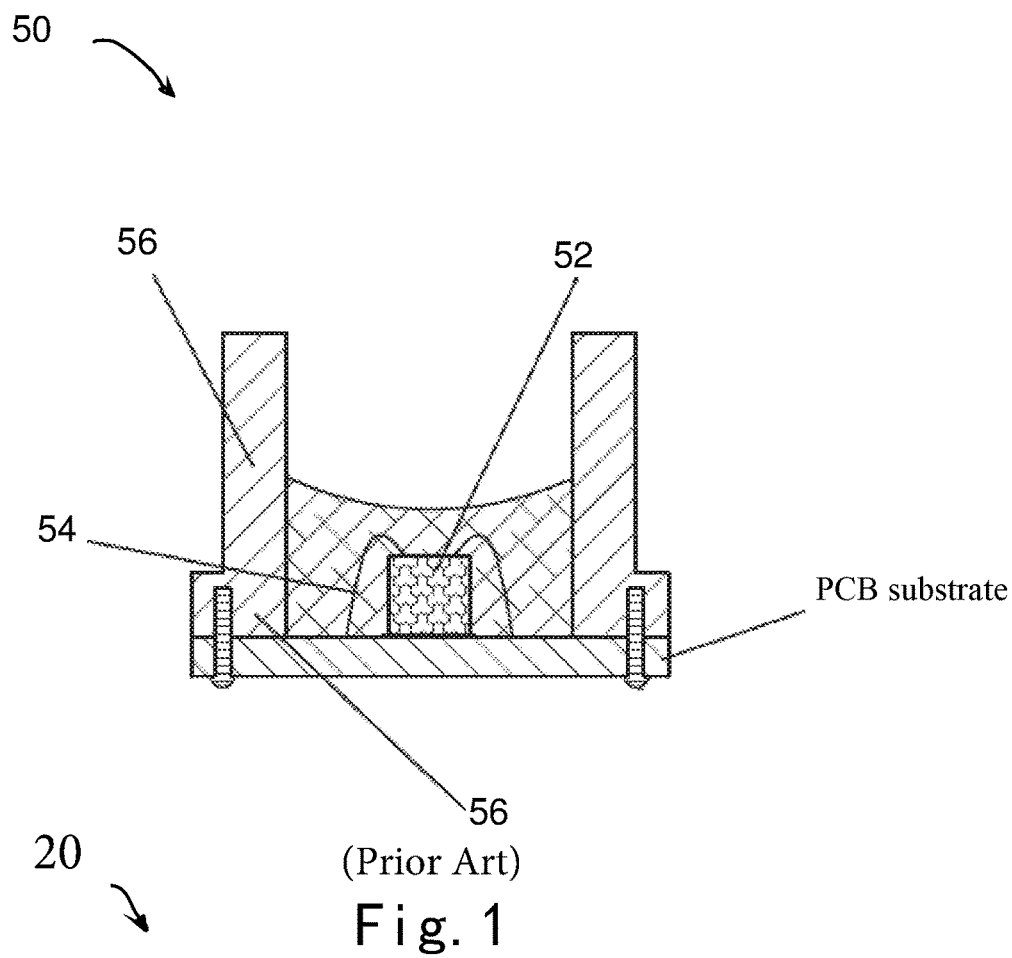
FIG. 1 is a sectional view of a chip package of a tire pressure monitoring sensor in the prior art.
Figure 2:
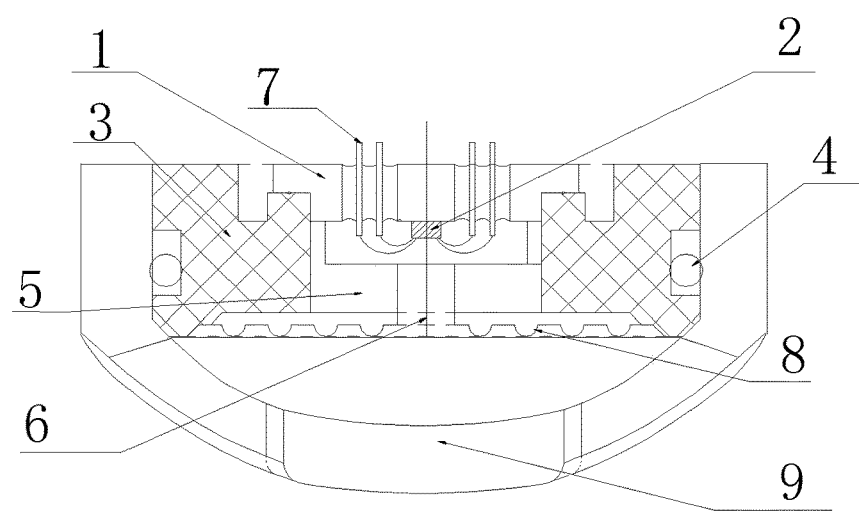
FIG. 2 is a sectional view of a pressure sensor core of a tire pressure monitoring sensor according to one embodiment of the present application.

FIG. 2 is a sectional view of a pressure sensor core 20 of a tire pressure monitoring sensor according to one embodiment of the present application. It should be noted that this and other subsequent figures are merely used as examples, and are not necessarily drawn to scale, and should not be taken as a limitation to the scope of protection of the present application.

As shown in FIG. 2, the pressure sensor core 20 mainly includes a tube socket 1, a silicon piezoresistive element 2, a sensor shell 3, a seal 4, a ceramic body 5, a pressure sensing and transferring medium 6, an output terminal 7, a metallic sensing diaphragm 8 and a protective shield 9. A pressure is applied to the metallic sensing diaphragm 8, and is delivered to the silicon piezoresistive element 2 through the pressure sensing and transferring medium 6, and finally a pressure signal is output by the output terminal 7. The seal 4 is an O-ring, which is mounted on the sensor shell 3, and functions to seal the sensor shell 3 and the protective shield 9. The ceramic body 5 and the tube socket 1 are mounted on the sensor shell 3, which serves the connecting and supporting functions. A plurality of openings are provided on the protective shield 9. The openings are used to ensure that the measurement of pressure is not affected while the metallic sensing diaphragm 8 can also be protected. The openings facilitate the flowing of the liquid and accurate sensing of pressure, and a chamfered structure is used at the junction between the protective shield 9 and the metallic sensing diaphragm 8, so that the transition is smooth, and tiny impurities that may be left can be flushed by use of the fluidity of liquid.

Figure 3:
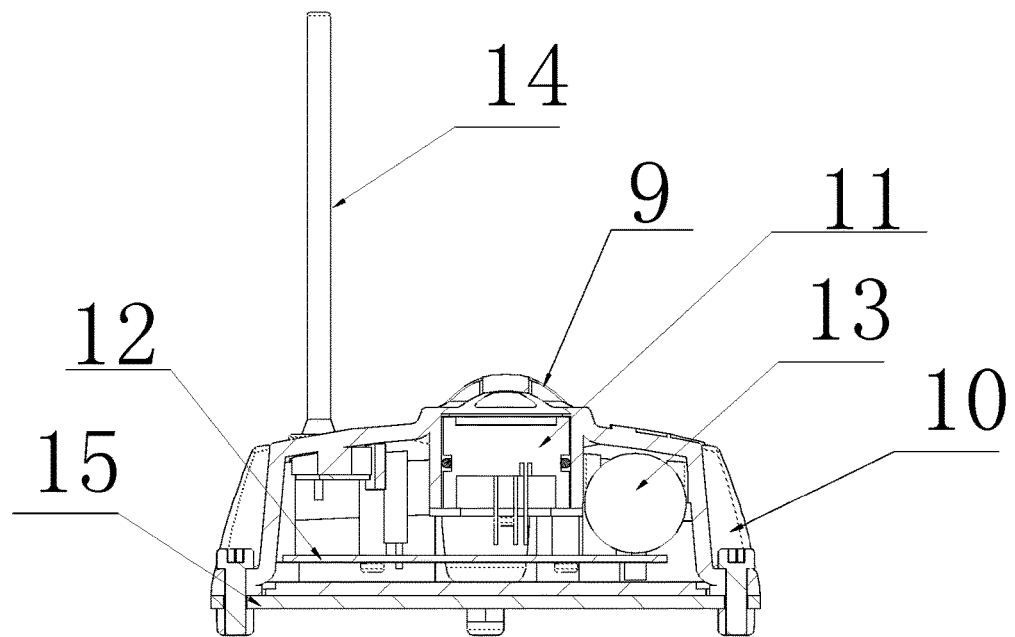
FIG. 3 is a sectional view of the overall tire pressure monitoring sensor for use in an engineering vehicle tire according to one embodiment of the present application.
Figure 4:
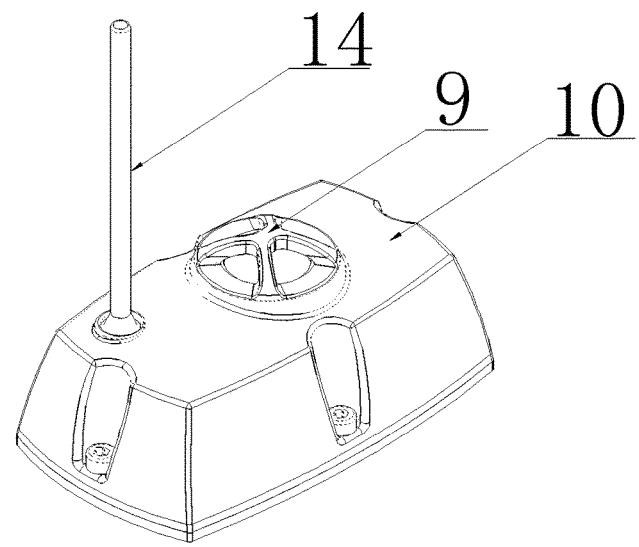
FIG. 4 is a structural schematic diagram outlining the tire pressure monitoring sensor for use in an engineering vehicle tire according to the embodiment as shown in FIG. 3.

FIG. 3 is a sectional view of the overall tire pressure monitoring sensor for use in a engineering vehicle tire according to one embodiment of the present application. FIG. 4 is a structural schematic diagram outlining the tire pressure monitoring sensor for use in a engineering vehicle tire of the embodiment as shown in FIG. 3. This embodiment continues to use the reference numbers of elements and part of contents of the preceding embodiment, wherein the same reference numbers are used to denote the same or similar elements, and the description of the same technical feature is selectively omitted. The description regarding the omitted part can be made a reference to the preceding embodiment, and will not be repeated again in this embodiment. As shown in FIGS. 3 and 4, the tire pressure monitoring sensor mainly includes a TPMS housing 10, a pressure sensor core 11, a PCB with a processing circuit 12, a battery 13, a transmitting antenna 14 and a metallic cover plate 15. The TPMS housing 10, the PCB with a processing circuit 12, the battery 13, and other components and parts can be sealed by pouring a sealant. An O-ring is also be used for the sealing between the pressure sensor core 11 and the TPMS housing 10.

In addition, the protective shield 9 passes through a large aperture provided on the TPMS housing 10 (FIG. 4), and the structure of the protective shield 9 is used for protecting the metallic sensing diaphragm 8 of the pressure sensor core. The protective shield 9 can be a separate part, or integrated with the TPMS housing 10.

The tire pressure monitoring sensor according to this embodiment may also be mounted on a tire or a rim of an engineering vehicle or a special vehicle via the metallic cover plate 15.

Compared with the prior art, the present application owns the following features and advantages.

1. The silicon piezoresistive element in the pressure sensor core is not in direct contact with the measured environment; meanwhile, the metallic sensing diaphragm and the pressure sensing and transferring medium are used for the transmission of pressure without affecting the measurement precision. Moreover, the risk is removed of blocking the air aperture and damaging the chip and binding wire due to the liquid added into the tire and the large amount of dust and other impurities in the working environment.

2. The protective shield is used to protect the pressure sensor core, and the pressure input aperture becomes larger, and at the same time a chamfered design is used at the junction between the pressure input aperture and the metallic sensing diaphragm, so that the transition is smooth, and tiny impurities that may be left can be flushed by use of the fluidity of liquid, which solves the problem that the pressure input aperture is easily blocked. As such, the product can be used to measure the pressure and output a signal. Also, the damage on the metallic sensing diaphragm caused by some harder impurities can be avoided.

The present application has been disclosed above in terms of the preferred embodiments which, however, are not intended to limit the present application, and any person skilled in the art could make possible changes and alterations without departing from the spirit and scope of the present application. Hence, any alteration, equivalent change and modification which are made to the above-mentioned embodiments in accordance with the substance of the present application and without departing from the contents of the present application, would fall within the scope of protection defined by the claims of the present application.

What is claimed is:

1. A tire pressure monitoring sensor (TPMS) comprising a TPMS housing, a pressure sensor core, a printed circuit board with a processing circuit, a battery, a transmitting antenna, and a metallic cover plate, wherein said pressure sensor core comprises a tube socket, a silicon piezoresistive element, a sensor shell, a seal, a ceramic body, a pressure sensing and transferring medium, an output terminal, a metallic sensing diaphragm, and a protective shield, wherein when said metallic sensing diaphragm is subjected to a pressure delivered to said silicon piezoresistive element through said pressure sensing and transferring medium, a pressure signal is output at said output terminal, said seal comprises an O-ring mounted on said sensor shell and used for sealing between said sensor shell and said protective shield, said ceramic body and said tube socket are mounted on said sensor shell to serve connecting and supporting functions, and said protective shield passes through a large aperture provided on said TPMS housing, and a plurality of openings are provided on the protective shield to ensure that the measurement of pressure is not affected while protecting said metallic sensing diaphragm.

2. The tire pressure monitoring sensor according to claim 1, wherein said TPMS housing, said printed circuit board with a processing circuit, and said battery are sealed by pouring a sealant.

3. The tire pressure monitoring sensor according to claim 2, wherein a seal is also used for sealing between said pressure sensor core and said TPMS housing.

4. The tire pressure monitoring sensor according to claim 1, wherein said tire pressure monitoring sensor is mounted on a tire or a rim via said metallic cover plate.

5. The tire pressure monitoring sensor according to claim 1, wherein a chamfered structure is used at a junction between said protective shield and said metallic sensing diaphragm.

6. The tire pressure monitoring sensor according to claim 5, wherein said protective shield is a separate part, or is integrated with said TPMS housing.

* * * * *

UNITED STATES PATENT AND TRADEMARK OFFICE
CERTIFICATE OF CORRECTION

PATENT NO. : 9,987,888 B2
APPLICATION NO. : 14/909662
DATED : June 5, 2018
INVENTOR(S) : Wei Li et al.

Page 1 of 1

It is certified that error appears in the above-identified patent and that said Letters Patent is hereby corrected as shown below:

On the Title Page

Column 2 (Abstract) Line 9 after "delivered" delete "to".

In the Specification

In Column 1 Line 3 below the application title insert:
--CROSS-REFERENCE TO RELATED APPLICATION
This application is a National Stage Application under 35 U.S.C. §371 and claims the benefit of International Application No. PCT/CN2014/081940, filed July 10, 2014, which claims priority to Chinese Application No. 201320472777.9, filed on August 2, 2013. The disclosure of the foregoing application is hereby incorporated by reference in its entirety.--, therefor.

Signed and Sealed this
Fifth Day of May, 2020

Andrei Iancu
*Director of the United States Patent and Trademark Office*